(12) United States Patent
Ertürk et al.

(10) Patent No.: US 12,166,571 B2
(45) Date of Patent: Dec. 10, 2024

(54) ROBUST CODE / DATA HIDING METHOD AGAINST ANALOG TRANSMISSION (OVER THE AIR) FOR DIGITAL AUDIO

(71) Applicants: Ismail Ertürk, Başiskele (TR); Yildiray Yalman, Körfez (TR); Necla Bandirmali Ertürk, Başiskele (TR); Mehmet Yakut, Başiskele (TR); Cem Cihangir Üstün, Ankara (TR); Mahmut Ogurlu, Bayrampaşa (TR)

(72) Inventors: Ismail Ertürk, Başiskele (TR); Yildiray Yalman, Körfez (TR); Necla Bandirmali Ertürk, Başiskele (TR); Mehmet Yakut, Başiskele (TR); Cem Cihangir Üstün, Ankara (TR); Mahmut Ogurlu, Bayrampaşa (TR)

( * ) Notice: Subject to any disclaimer, the term of this patent is extended or adjusted under 35 U.S.C. 154(b) by 384 days.

(21) Appl. No.: 17/623,284

(22) PCT Filed: Jul. 28, 2020

(86) PCT No.: PCT/TR2020/050665
§ 371 (c)(1),
(2) Date: Dec. 28, 2021

(87) PCT Pub. No.: WO2021/021059
PCT Pub. Date: Feb. 4, 2021

(65) Prior Publication Data
US 2022/0368450 A1   Nov. 17, 2022

(30) Foreign Application Priority Data

Aug. 1, 2019 (TR) .................................. 2019/11637

(51) Int. Cl.
*H04K 1/10* (2006.01)
*H04K 1/04* (2006.01)

(52) U.S. Cl.
CPC ................. *H04K 1/10* (2013.01); *H04K 1/04* (2013.01)

(58) Field of Classification Search
CPC .................................. H04K 1/10; H04K 1/04
(Continued)

(56) References Cited

U.S. PATENT DOCUMENTS 4,035,091 A * 7/1977 Townsend ............... B43L 15/00
  401/52
5,870,499 A * 2/1999 Bender .................. G06T 1/005
  380/54

(Continued)

*Primary Examiner* — Dant B Shaifer Harriman
(74) *Attorney, Agent, or Firm* — Jose Cherson Weissbrot

(57) ABSTRACT

The present invention is relates a robust code/data hiding method against analog transmission (over the air) for digital audio, secret code/data hiding component to digital audio file and extracting the hidden code/data from the covered sound, which a digital audio where a secret code/data is embedded is played from the loudspeakers in any environment and media player, the digital audio is received by the user mobile phone or mobile device microphone without being affected by the distorting effects of the analog transmission medium and the noise in any way, enabling follow-up information based on user interaction and user product experience. The present invention can be used in many areas such as the participation of users in a campaign via mobile phone, increasing the TV/radio viewing rate (rating) & follow-ups, copyright tracking & management, participating in sweepstakes, distributing instant coupons, authentication and delivering advertisements to target customer groups.

15 Claims, 12 Drawing Sheets

(58) Field of Classification Search
USPC .......................................................... 380/253
See application file for complete search history.

(56) References Cited

U.S. PATENT DOCUMENTS

| | | | | |
|---|---|---|---|---|
| 6,473,516 | B1* | 10/2002 | Kawaguchi | H04N 1/32251 |
| | | | | 382/100 |
| 8,437,385 | B1* | 5/2013 | Dark | H04L 1/248 |
| | | | | 455/126 |
| 9,396,733 | B2* | 7/2016 | Pun | G10L 19/018 |
| 10,885,902 | B1* | 1/2021 | Papania-Davis | G10L 15/1815 |
| 2002/0106104 | A1* | 8/2002 | Brunk | H04N 1/32352 |
| | | | | 704/E21.001 |
| 2002/0150416 | A1* | 10/2002 | VanDruff | G06F 3/0238 |
| | | | | 400/103 |
| 2007/0180251 | A1* | 8/2007 | Carr | H04N 1/32203 |
| | | | | 713/176 |
| 2008/0189119 | A1* | 8/2008 | Oh | G10L 21/0364 |
| | | | | 704/E21.009 |
| 2008/0215333 | A1* | 9/2008 | Tewfik | H04N 21/8358 |
| | | | | 704/E19.01 |
| 2009/0012789 | A1* | 1/2009 | Gaudet | G06F 40/274 |
| | | | | 704/251 |
| 2009/0220081 | A1* | 9/2009 | Schneider | H04L 63/0435 |
| | | | | 380/255 |
| 2012/0230612 | A1* | 9/2012 | Huseby | A45C 3/00 |
| | | | | 383/21 |
| 2012/0311623 | A1* | 12/2012 | Davis | H04N 5/765 |
| | | | | 725/18 |
| 2016/0293171 | A1* | 10/2016 | Baeck | G10L 19/018 |
| 2019/0189135 | A1* | 6/2019 | Ananthabhotla | G10L 19/26 |

* cited by examiner

There will be scattering due to sudden transitions in the frequency spectrum of the signal. Therefore, the signal is passed through a windowing function (Hamming, Hanning etc.).

The same operations are applied to the sinuses produced for "0" and "1".

ROBUST CODE / DATA HIDING METHOD AGAINST ANALOG TRANSMISSION (OVER THE AIR) FOR DIGITAL AUDIO

TECHNICAL FIELD

The present invention relates to a computer, television, radio, mobile phone etc. of a digital audio in which the secret code/data is overlaid and information based on user interaction and user product experience, after the digital sound in question is played with the mobile phone microphone after being played through the speaker in any music and sound system without being affected by the distorting effects of the analog transmission environment and noise by offering the possibility of valuable information acquisition

STATE OF THE ART

Due to the developing technology, data protection becomes more and more important day by day. For this reason, important studies have been carried out in recent years basically aiming to increase data security. When the studies in the literature are examined, it is seen that various algorithms have been developed. It is seen that among these algorithms, steganography-based algorithms give successful results. Steganography is a method of data hiding based on the technique of storing data that is desired to be hidden in a cover data. Data hidden in this method is difficult to decode unless it is a decoder. This approach is also defined as the masking or hiding of data in a medium.

Steganography covers many topics such as invisible ink, hidden places, microdots and computer-based methods.

Today, a wide variety of techniques are used to hide information in any media. For this reason, selection of the method to be used to hide the message in a media should be made after the cover environment is selected. Solutions performed in time space are mostly suitable for file-based data transmission and face intolerable high bit error rates (BER) during the air transfer stage of the voice. The least-valued bit (LSB) encoding, echo hiding, and hiding in silence intervals are common examples. On the other hand, among the solutions in frequency space, which also includes the subject of the invention, it is recommended to use LSB coding, phase coding and amplitude coding approaches in discrete wavelet transforms.

In one of the first studies in the state of the art, data transmission is recommended over the acoustic channel and with real-time audio data hiding. This method, which is inspired by Spread Spectrum (SS) stigmatization, utilizes predictive frequency masking properties of the cover sound, and aims for acoustic positioning and navigation applications for closed areas.

In another data hiding method known for its high capacity feature, the masking feature of the human hearing system was used. In the method in which the audio signal is separated into sub-band signals and some of them are selected to hide data, are based on estimates of the all pass filters finite-length impulse responses. This solution, which is especially resistant to synchronization-disruptive attacks, has been accomplished with non-formal (subjective) hearing tests and has been proposed for sound watermarking applications to prevent unauthorized copying.

In a simulation-based study, which performed data hiding in the sound, resistant to the negativities caused by airborne and speech codecs, sub-band amplitude modulation was used. This method, which could not provide high performance compared to human hearing system perception evaluation and BER results up to 15%, was too far from finding application areas in the sector.

Another watermarking approach developed for digital audio copyright protection is based on the Fast Fourier Transform (FFT). In the method where the sound is divided into non-overlapping frames, data is hidden in the selected peaks of the amplitude spectrum of each frame.

In another study where sound watermarking method has been developed in frequency space, it is aimed to put annotations on acoustic files and to place digital signatures on audio signals (for copyright protection, for example). In the approach where data pre-coding (Dirty Paper Codes) and Low Density Parity Control (LDPC) are used in the log-spectrum space to cancel the interference, Walsh functions are used as digital signatures.

In a study aiming for robustness and imperceptibility optimization, a time diffuse eco-based sound stamping approach is presented. The method using a convex optimization based finite impulse response (FIR) filter design to obtain optimal eco filter coefficients is based on a recommended maximum power spectral margin to ensure that it is not felt by the human hearing system.

The acoustic confidential data transmission method has been developed with another study in the Modulated Complex Lapped Transformation (MCLT) space by means of speaker-microphone arrangement. In the method, the data is hidden by arranging the phases of the sound wave MCLT coefficients. This approach, known to be suitable for short message transmissions at distances of less than 1 meter, can provide limited hearing test performance. This solution was adapted subsequently, and a new approach was obtained that provides better sound quality-data communication performance compromises.

PURPOSE OF THE INVENTION

The invention subject to registration, while a digital sound in which the secret code/data is overlaid is played from the loudspeaker in any environment and device, the user interactions with the mobile phone microphone using mobile app, it aims to provide information based on product experience.

The invention subject to registration is the participation of users in a campaign via mobile phone, increasing the TV/radio viewing rate (rating) and tracking, copyright tracking and management, participating in sweepstakes or voting, distributing instant coupons, authentication and delivering advertisements to target customer groups, etc. can be used in many areas.

DESCRIPTION OF THE FIGURES

The figures for the robust code/data hiding method against analog transmission (over the air) for digital audio, together with a web system, which is integrated with mobile phone (device) interaction and media players are shown below.

DESCRIPTION OF THE REFERENCE NUMBERS IN THE FIGURES

Figure 1:
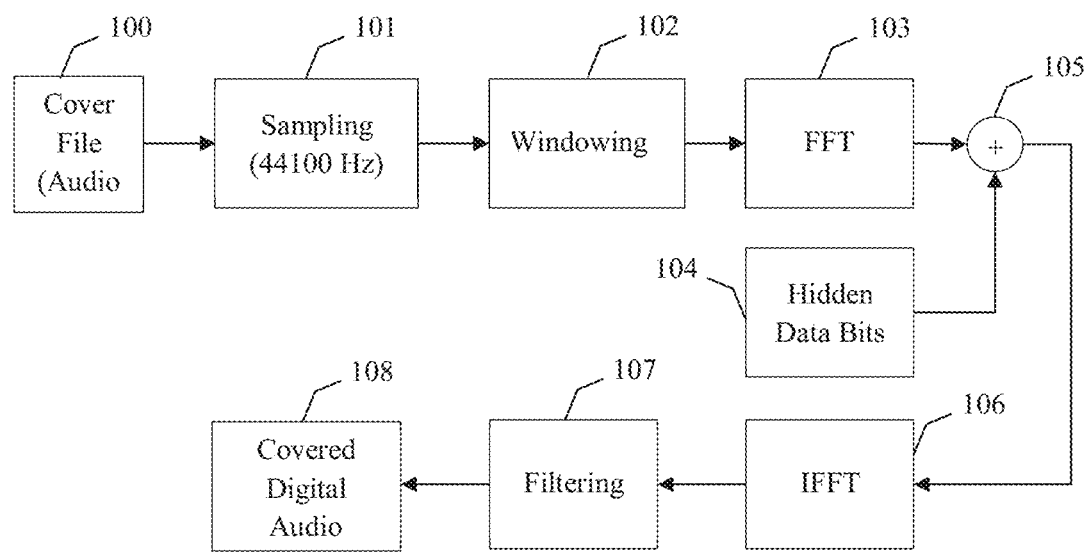
FIG. 1. Block diagram of the robust code/data hiding method against analog transmission (over the air) for digital audio FIG. 2. The encoding component (code/data hiding into digital audio) of the robust code/data hiding method against analog transmission (over the air) for digital audio FIG. 3. Scheme of the code/data hiding component design & logic level of the robust code/data hiding method against analog transmission (over the air) for digital audio FIG. 4. Sampling and "Pointer" signal of the robust code/data hiding method against analog transmission (over the air) for digital audio FIG. 5. Frequency values used in the robust code/data hiding method against analog transmission (over the air) for digital audio FIG. 6. Sound spectrum and the method's working region FIG. 7. Block scheme of hiding code/data bits into the cover file "way" array FIG. 8. Frame format and bit timings (for 48-bit encoded data) of the robust code/data hiding method against analog transmission (over the air) for digital audio FIG. 9. Block diagram of the extracting hidden code/data bits from over the air digitized sound FIG. 10. Block diagram of the code/data decoding component (extracting hidden data from the covered sound) of the robust code/data hiding method against analog transmission (over the air) for digital audio FIG. 11. Block scheme for the covered media transmitter-receiver/transmission mechanism, covered sound transmission apparatus, mobile phone (mobile device) hidden code/data decoding method & apparatus and general web setup of the robust code/data hiding method against analog transmission (over the air) for digital audio FIG. 12. Mobile phone (mobile device) and mobile app overview of the robust code/data hiding method against analog transmission (over the air) for digital audio FIG. 13. Web panel, web app and data presentation overview of the robust code/data hiding method against analog transmission (over the air) for digital audio The figures for the sample application areas of the developed robust code/data hiding method against analog transmission (over the air) for digital audio are shown below.

The reference numbers shown on the figures of the robust code/data hiding method against analog transmission (over the air) for digital audio are described below:

100. Cover audio file
101. 44.100 Hz sampling
102. Windowing
103. FFT (FastFourierTransform)
104. Hidden code/data bits ($D_{N-1}$-$D_0$)
105. Process
106. FFT (Inverse Fast Fourier Transform)
107. Filtering
108. Covered digital audio output
200. Gain control
201. Windowed signal outputs
202. $f_M$ pointer signal input
203. $f_1$ logic 1 level signal input
204. $f_0$ logic 0 level signal input
205. Not logic gate
206. Control array, verification test and generator
207. f 44.100 Hz/512 clock (clk) signal
208. QSO shift register output (ShiftOut)
209. $Q_M$ pointer (Marker) output
210. $Q_{DB}$ code/data/space (Data Bits) output
211. $Q_W$ window output
212. LD load input
300. Valid data outputs
301. Empty frame
400. 256 sampled sound
500. Audio frequency zone in the audible band
501. 19 signal frequency values
600. Sound spectrum outside the working area of the method
700. Cover file (way array)
701. Obtaining 256-sample
702. Creating 256-sample blocks
703. 256-sample 19.464 Hz "Marker" series creation
704. 256-sample 18.604 Hz "0" series creation
705. 256-sample 20.324 Hz "1" series creation
706. 256-sample "Space" series creation
707. Marker frame, code/data bits, and space frame adding (ShiftRegister) selector
708. Selecting one of the 4 positions
709. Code/data hidden way array (covered file)
710. Original way FFT
711. "Marker" added FFT
712. "0" added FFT
713. "1" added FFT
714. "Space" added FFT
715. Process
800. Frame Markerpart (1 Bit)
801. Frame Country Code part (16 Bit)
802. Frame Firm Code part (16 Bit)
803. Frame Campaign Code part (16 Bit)
804. Frame Cyclic Redundancy Check (CRC) part (8 Bit)
805. Empty Frame part (1 Bit)
900. Microphone (mobile device/phone)
901. 512-sample buffer
902. Obtaining 256-sample blocks (frame0 and frame1)
903. Pointer detection
904. Pointer start detection
905. Code/data bits resolving
906. Code/data bits output
1000. Covered/coded sound $V_{KS}$ (t)
1001. Narrow band filter ($f_M$ "Marker") $V_{MDB}$ (t)
1002. Narrow band filter ($f_1$ "1") $V_{1DB}$ (t)
1003. Narrow band filter ($f_0$ "0") $V_{ODB}$ (t)
1004. Bandpass filter $V_{BG}$ (t)
1005. Single shot repeat trigger multivibrator
1006. Absolute value and low pass filter $V_{1DB}$ (t)
1007. Absolute value and low pass filter $V_{ODB}$ (t)
1008. Absolute value and low pass filter $V_{BG}$ (t)
1008. Threshold (Th)
1009. Power amplifier (k)
1010. Comparator
1011. Process
1012. 0.5 constant input
1013. Data start (DS)
1014. Data output
1015. Valid Data
1016. Decoding logic component
1017. Reading data (RD)
1018. Data outputs ($D_{N-1}$-$D_0$)
1019. Data integrity information (DOK)
1100. Computerized code/data hiding component
1101. Audio encoder 1102. Cloud network (network)
1103. Data analytics
1104. Big data
1105. Database
1106. Web server
1107. Web browser (mobile device)
1108. Mobile phone (device) application
1109. Hidden code/data decoding component
1110. Mobile phone (device)
1111. Multimedia player
1112. Loudspeaker
1113. Covered sound output
1114. Covered media broadcast over RF, satellite, direct or internet
1200. Covered sound pickup & covered sound processing component
1201. Covered audio analysis and hidden code/data decoding components
1202. Mobile phone (device) screenshot
1203. Covered sound pickup & covered sound processing button
1204. Mobile application icon
1300. Computer
1301. Keyboard
1302. Mouse
1303. Monitor
1304. Web browser
1305. General system management, campaign management and data presentation web panel & webapp
1306. Adding a new campaign (code/data—url matching definition)
1307. Campaign editing (code/data—url matching change)
1308. Active Campaigns (data representation)
1400. Process timing (tn)
1500. A customized device that can receive covered sound (appliance)
1600. Covered sound broadcast medium The invention is generally about obtaining information based on user (audience/audience), user interaction and user product experience from private or public audio or multimedia broadcasts made via computer, television, radio, mobile phone, music and voice systems. In particular, it concerns the realization of code/confidential data transmission over the air (speaker to microphone) in noisy environments within audio or multimedia signals. As explained in detail in FIG. 11, the invention creates automatic tracking statistics in mobile device (phone), server and web integrated structure, increase broadcast view/watching rate, advertising effectiveness and cost analysis, copyright and activity tracking, participation in campaigns, surveys. It can be used in participation, sweepstakes, coupon distributions, multimedia file stamping and general or customized authentication and customer (user) interaction.

Figure 12:
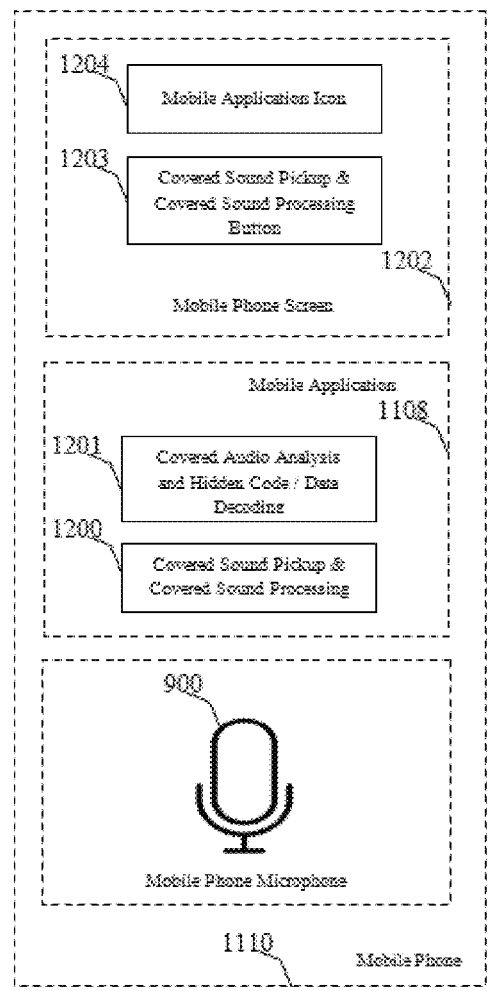

Invention: Within the scope of the general system architecture, which is shown in FIG. 12, the voice of the subject is played in audiovisual electronic devices and the covered voice emitted from the speaker is received with the user mobile phone microphone, the code/secret data hidden in the sound is extracted with the mobile phone application and with the interaction of the web server, which is shown in detail FIG. 13, the user automatically participates in an advertisement campaign and the web page of this advertisement campaign is opened in the web browser application on the user mobile phone. The scope of the invention is not limited to this, but there are many application areas.

Figure 14:
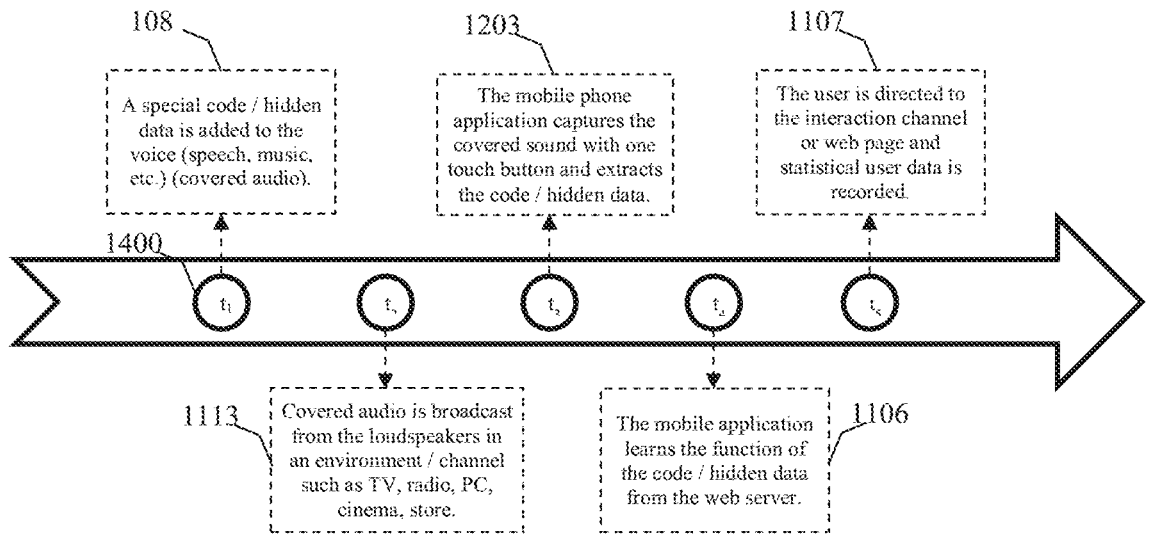
FIG. 14. General system and advertising campaign (TV or radio) sample application steps of the robust code/data hiding method against analog transmission (over the air) for digital audio FIG. 15. General system and TV/radio rating measurement sample application steps of the robust code/data hiding method against analog transmission (over the air) for digital audio FIG. 16. General system and shopping center instant (hop) coupon & discount application steps of the robust code/data hiding method against analog transmission (over the air) for digital audio
Figure 15:
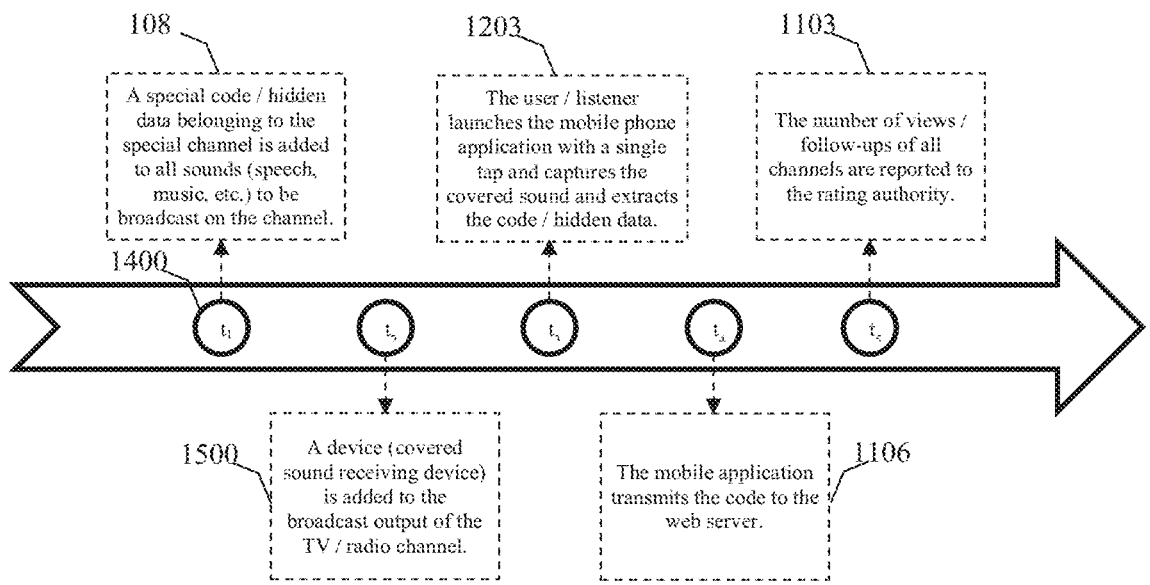
Figure 16:
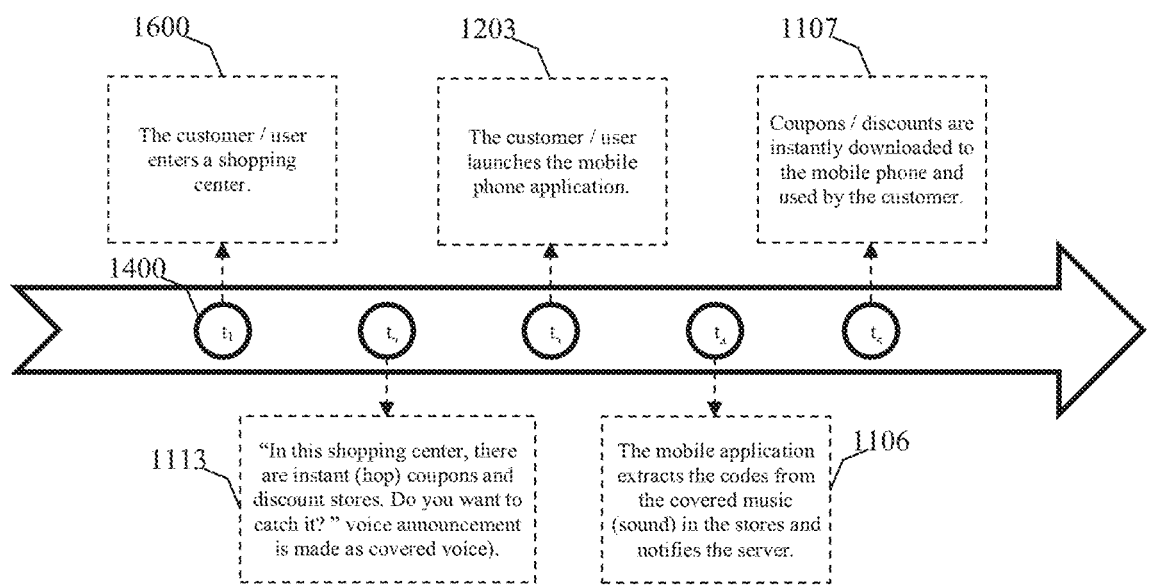

For example; the applications of the invention in FIG. 14, FIG. 15 and FIG. 16 are for the authentication usage, delivery of advertisements to the target customer groups & for increasing the TV/radio view rate (rating), and participation in campaigns, copyright monitoring & management, participation in the sweepstakes and instant coupon offering, which are given in detail.

The invention technically consists of two main subcomponents. In FIG. 1, FIG. 2, FIG. 3, FIG. 7 and FIG. 8, the computerized code/data hiding component is shown in detail in the digital audio file while in FIG. 9 and FIG. 10, the component of extracting the hidden code/data from such a covered audio file created by the airborne microphone is shown.

Code/Data Hiding Component: After the cover sound file (100), which is transmitted over the air, is obtained in digital environment, numerical data in the frequency band over the hearing frequency limits are superimposed as narrow band frequency regions. The method used is based on the sequential addition of code/data bits to the frequency values on the hearing region boundaries in the spectrum using Fast Fourier Transform—FFT (103) and InverseFastFourier Transform—IFFT (106) with the sampling frequency of 44100 Hz (101) and above. First, a pilot signal for synchronization is superimposed on the sound segment consisting of 128/256 samples, the secret code/data bits (104) to be added for subsequent sound blocks and then the signals of the control bit are added.

Naturally, the intermittent overlay of frequency components not found in the sound on the spectrum leads to a disruptive effect that can be expressed as "sizzling" and audible by the human ear, even outside the hearing site boundaries. Therefore, filtering 107 is performed to soften these artificial noises, which become audible due to sudden transitions after the overlay. The general block diagram of the computerized code/data hiding process that can be realized with the use of signal processing tools is shown in FIG. 1.

Marker signal frequency is 19464 Hz, numerical buried data signal frequencies are determined as $f_1$ logic 1 level signal input (203) to the right of this marker signal frequency and $f_0$ logic 0 level signal input (204) to its left. Each coefficient obtained as a result of the FFT process;

It has a frequency value of 44100/256=172,265 Hz.

Marker signal frequency; (44100/2)−(15×172,265) =19464 Hz,

The signal frequency values for binary (0 or 1) values that compose the code/hidden data are;

(44100/2)−(10×172,265)=18604 Hz and (44100/2)−(20×172,265)=20324 Hz.

Figure 4:
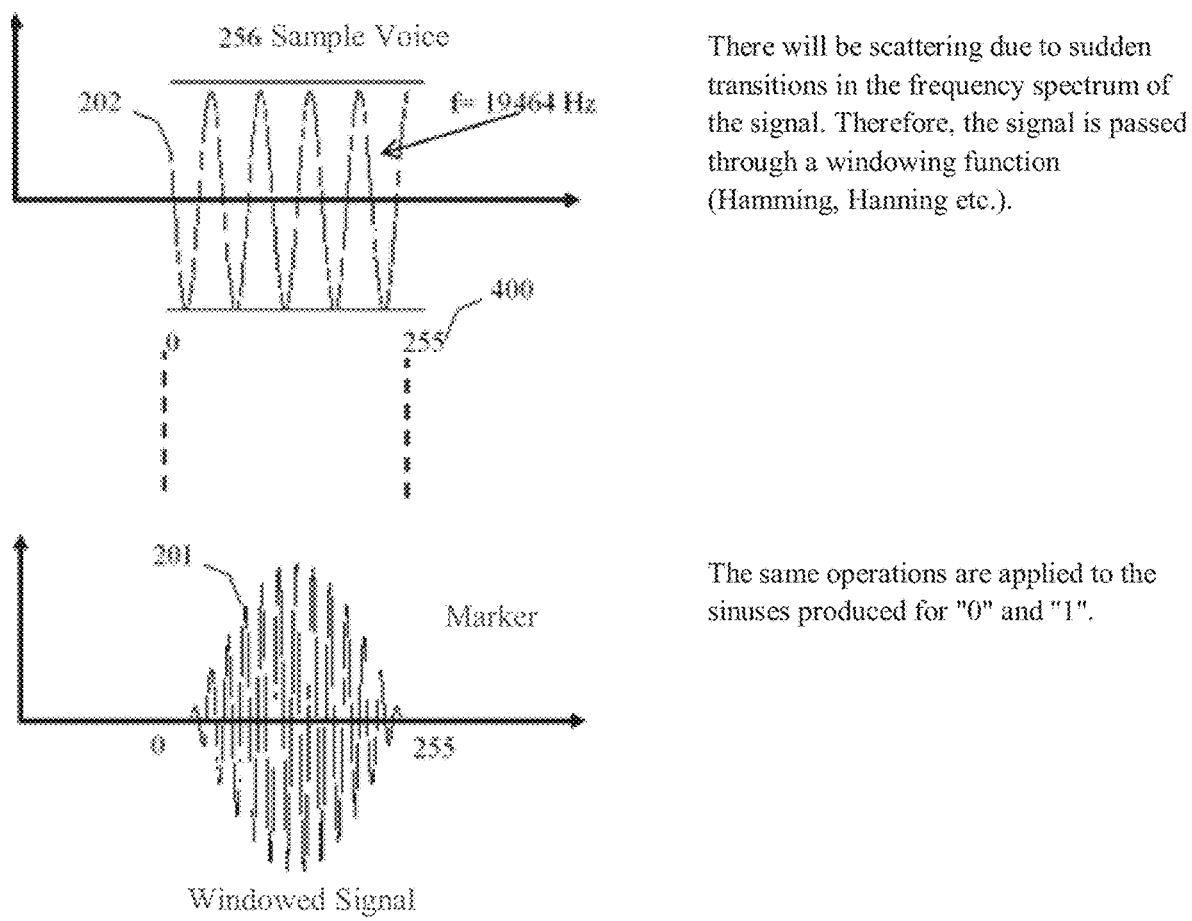
Figure 5:
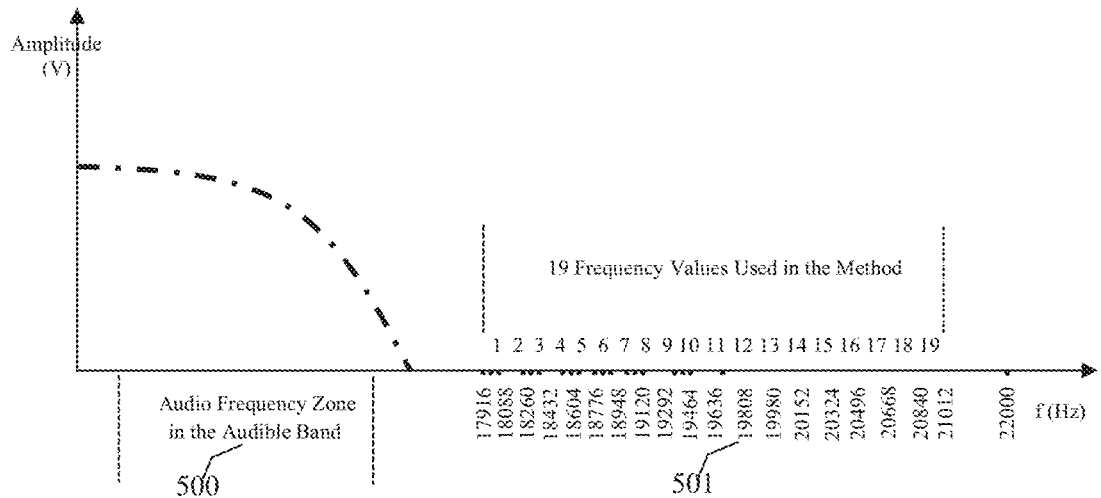
Figure 6:
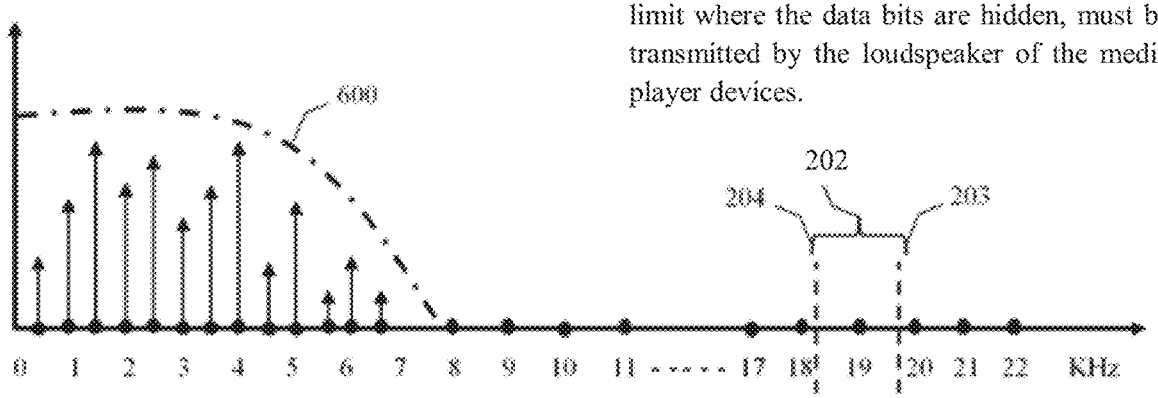

The marker frequency, the general audio spectrum, that is, the audio frequency region (500) in the audible band and the working frequency region of the invention, and 19 signal frequency values (501) used in the scope of the invention are presented in FIGS. 4, 5 and 6.

19 different frequency values and working frequency region of the method selected for overlaying within the code/data hiding method are shown in FIG. 5. One of them is used as "Marker" signal, one as logic "1" signal and one as logic "0" signal. Although these 19 signal signals are not limited to (501), the total number of available alternative signal frequency schemes is 5814:

$$\frac{n!}{(n-p)!} = \frac{19!}{(19-3)!} = 19 \times 18 \times 17 = 5814$$

Each frequency scheme (triple group) can be used for a different application. For each frequency scheme, a different named mobile application can be developed, or a mobile application can be used to decode hidden data by using specified signal frequency scheme.

In the receiver application, a Marker signal other than the code/data bits signals to be hidden is used just before the binary code/data bits for easy and reliable code/data analysis; $f_M$=19464 Hz.

Sine signals are used to the right and left of the Marker signal frequency (±5×Δf) for binary code/data bits to be hidden. In other words;

19464 Hz−(5×171,265 Hz)=18604 Hz for "0" and

19464 Hz+(5×171,265 Hz)=20324 Hz for "1".

The 256-sample sine signal is shown in FIG. 4. In the method, 256 samples Marker, "0" and "1" data series are obtained initially. Then, as shown in FIG. 2 and FIG. 3, each bit of the 8-bit code/data is checked sequentially, firstly the marker array into the way sound file sequence, 256 bits, then 0 bits, 1 bit, and 7 bits of the data to be added without overflow.

Figure 2:
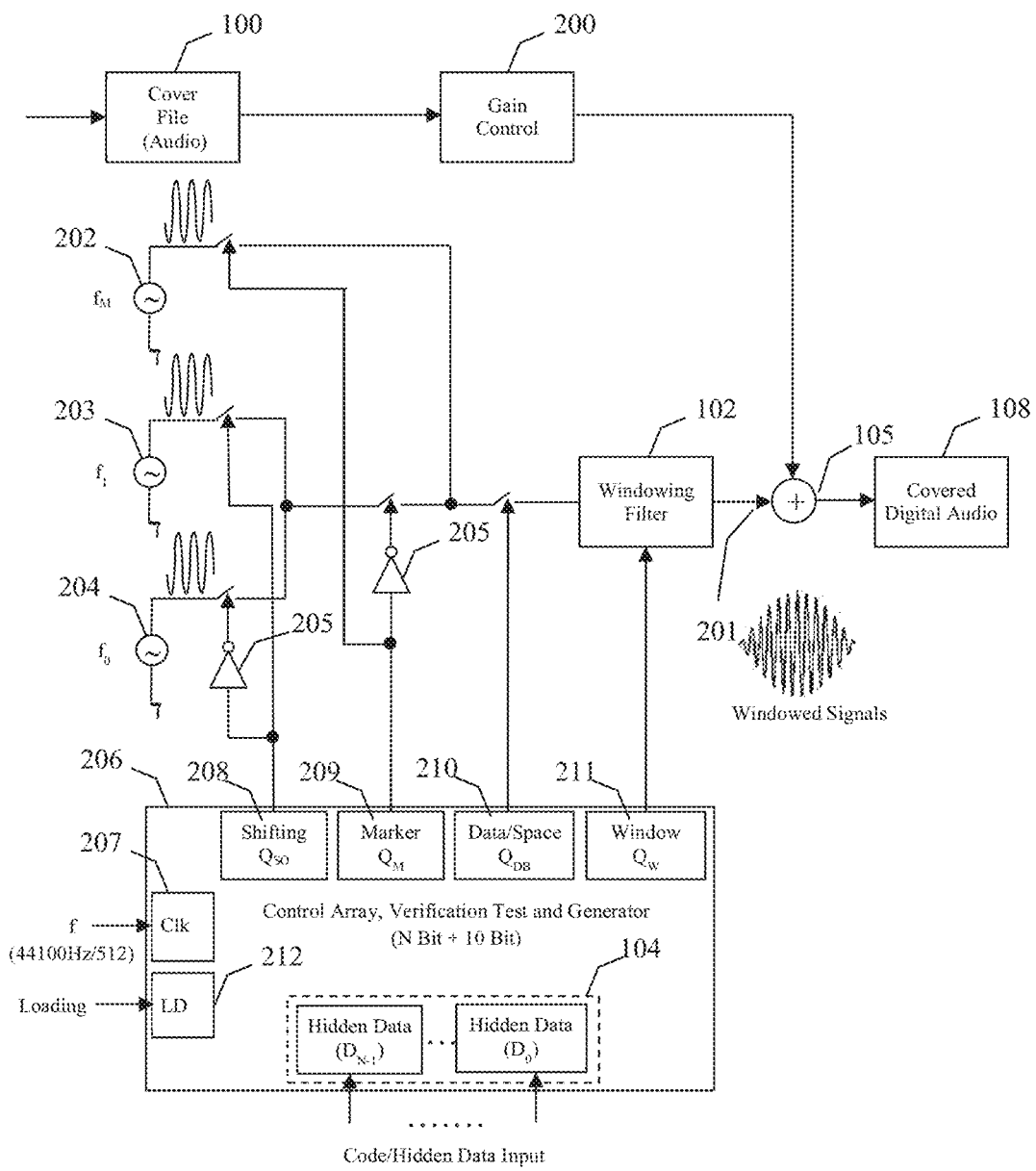
Figure 3:
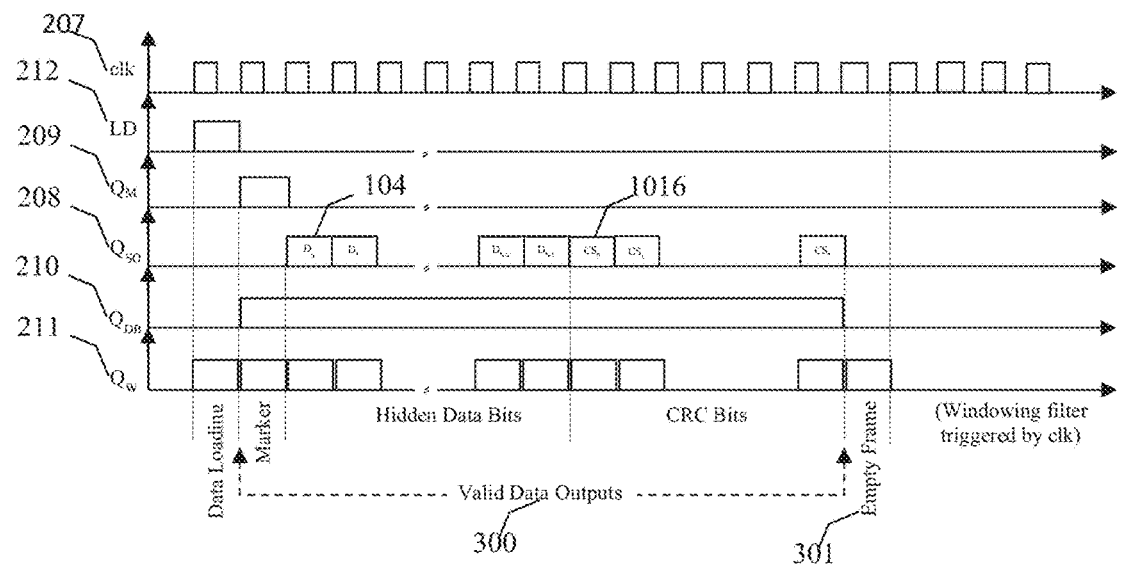
Figure 7:
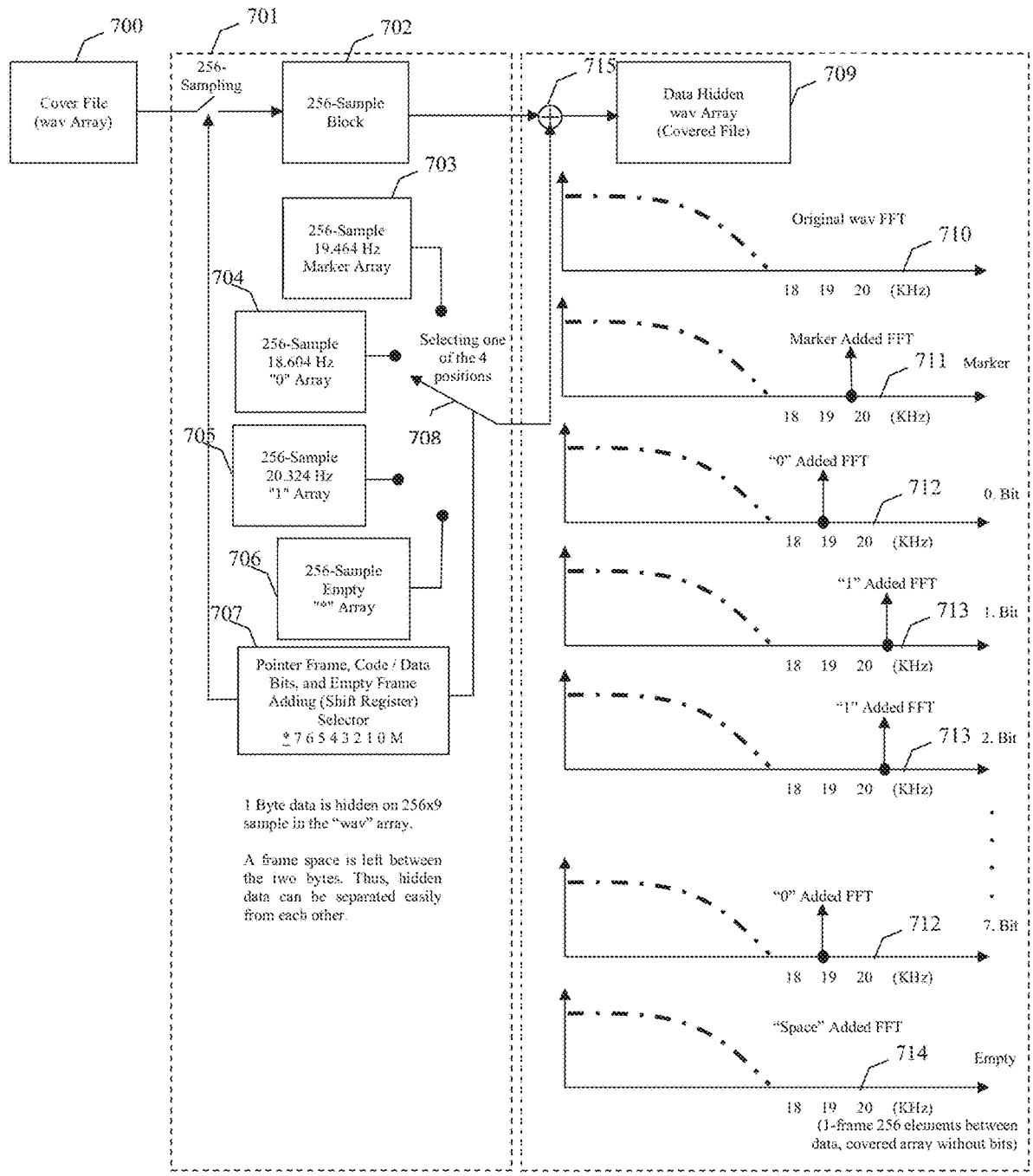

The pseudo code of the method of hiding the code/data bits into the "way" audio file data array presented in FIG. 2 and FIG. 7 is given below (on the next page):

frequency (19464 KHz) exceeds the predefined threshold value. If the threshold is exceeded, this may be a Marker signal. In this case, the starting point of the reference position of the Marker in the frame must be found. In order to synchronize with the code/data bits in time, FFTs are calculated on the existing 512 block of 64 samples right and left of 128 blocks of the first 256 blocks. Whether the marker frequency amplitude is higher on the right or left, 64 samples are headed in that direction, then FFTs are calculated for 32 right and left of this direction. In which direction the Marker frequency amplitude is higher 32 samples on the right or left, in that direction proceeded. Similarly, progress is continued up to 8, dividing by 2 at each step. As a result, a maximum of 8 samples will have the approximate slip and the location of the Marker (reference point). In this case, the data bits will start 256 samples ahead of the starting point. In addition to existing 512 samples, another 256 samples are collected for each bit and the data bits are detected in similar manner. In other words, some of the code/data bits are in this new blocks.

For the next block of 256 samples from the marker starting sample, FFT is performed and the frequency component amplitudes are examined 5×Δf left and 5×Δf right (18604 Hz and 20324 Hz) of the marker frequency. If amplitude of the component on the left is larger than

```
data = 45
file = read_wav(...)
fs = 256
index = 0
frameM = 256 samples          19 Khz windowed sinus array (marker)
frame0 = 256 examples         18 Khz windowed sinus array ('0')
frame1 = 256 samples          20 Khz windowed sinus array ('1')
loop: bit_no = 0
file (index) = file (index) + frameM    (Add marker array from index)
add: index = index + fs                 (move index to next frame)
if (data (bit_no) == 1)                 (add frame 1 if the data bit is "1")
    file (index) = file (index) + frame1
else file (index) = file (index) + frame0
    bit_no = bit_no + 1                 (move to next code / data bit)
if (bit_no<8) goto add                  ("add" until the last code / data bit is
                                         added)
index = index + fs                      (skip one frame, leave empty)
while (file (index) goto loop:          (until the "wav" file reaches the end
                                         add as much code / data to the array -
                                         many times)
write_wav (file)                        (save encoded file covered sound)
```

Figure 8:
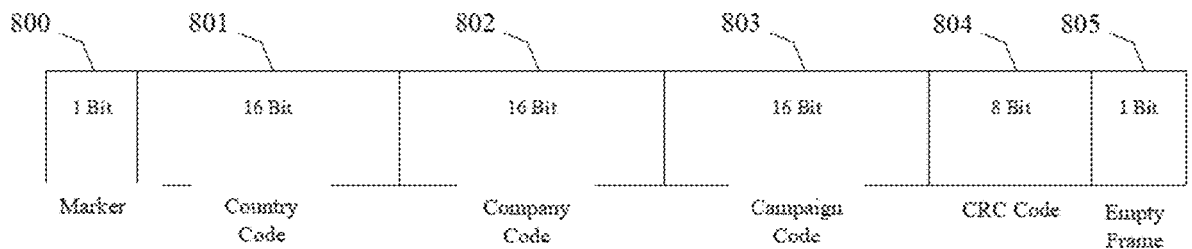

The frame format used in the code/data hiding method is shown in FIG. 8. The total frame size is 58 Bits.

The duration of 1 bit is 0.005813 sec: 1/172 Hz=0.005813 sec.

58 Bit frame time is 0.337209 sec: 58×0.005813 sec=0.337209 sec.

With this method, 3 codes can be carried in 1 second voice (data can be hidden).

Figure 9:
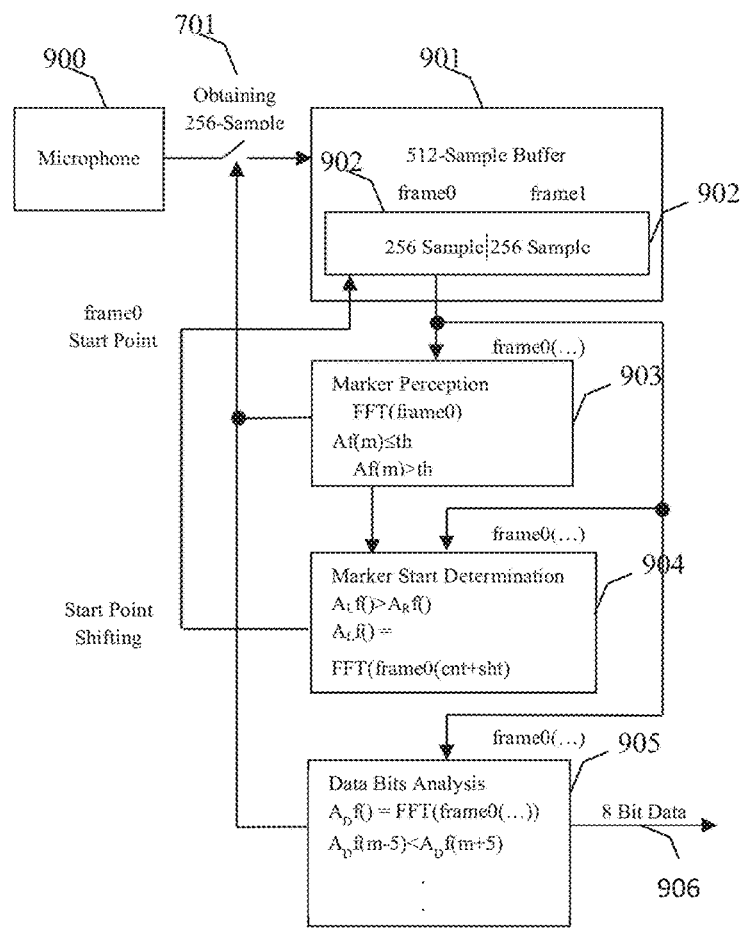
Figure 10:
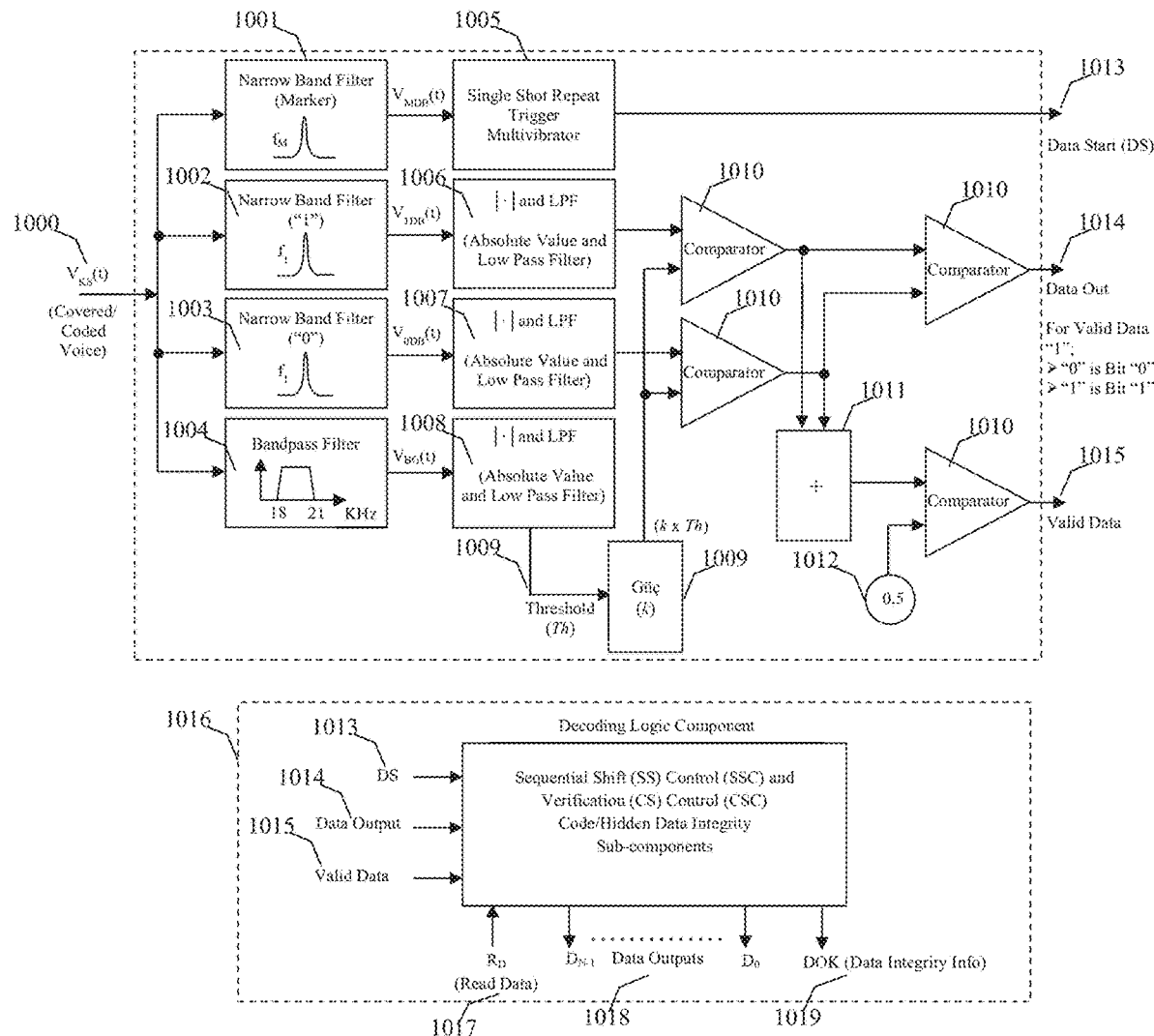

Code/Data Decoding Component: The code/data extraction and decoding method components from over the air covered sound are shown in FIG. 9 and FIG. 10. The effective working distance of the method, which varies between 5-10 meters, determines the physical properties of the air transmission medium/environment, noise, disruptive factors, especially speaker-microphone directions (physical direction) and physical characteristics.

Microphone (900) of the mobile device/phone audio input is sampled at 44100 Hz. 512 sample buffers (901) are sampled to start. The first 256 samples of this block are taken and FFT is tested to see if the amplitude in the Marker amplitude of the component on the right and above the default threshold level, the data bit for that block is "0". If amplitude of the component on the right (20324 Hz) is greater than amplitude of the component on the left (18604 Hz) and is above the default threshold level, the data bit of the block is "1". If amplitude of the larger component does not exceed the predefined threshold value, the Marker may be detected incorrectly, the data format is incompatible, or data is hidden in a different system (or the mobile device/phone microphone, the hidden sound source is too far from the speaker being played). In this case, Marker detection process is restarted. If the code/data bit is found and having sufficiently high amplitude, 256 new samples are sampled for the analysis of the next bits, and the process continues until 8 bits are completed. In the 256-element block at the end of 8 bits, both the Marker and the data bits should not be present (code silence interval).

Figure 11:
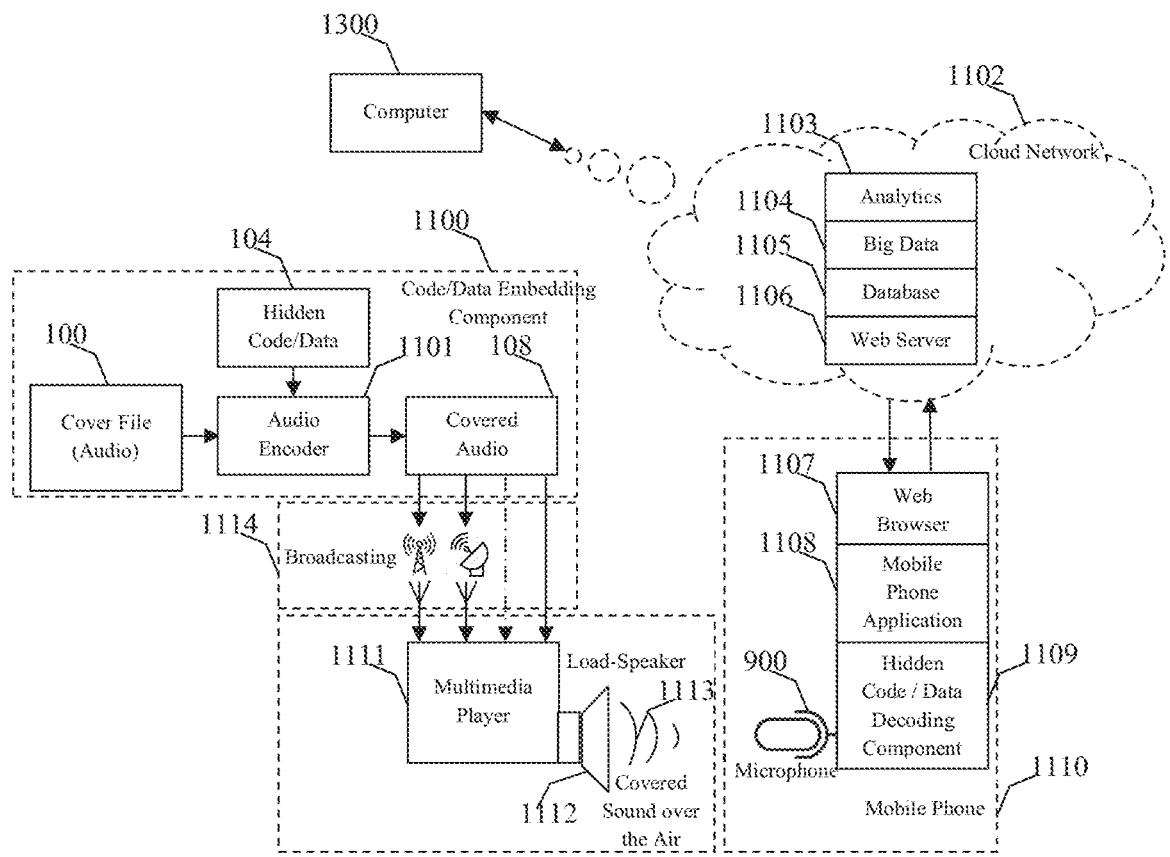

If this condition is also met, the data is considered valid as shown in FIG. 11 and FIG. 14 and used to connect to the internet server (for the advertising campaign mobile application example). It should be noted that if signal frequency components will be used for the Marker, "0" and "1" in the covering sound, instead of calculating 256 FFT values, fast algorithms that can calculate only the amplitudes of the respective frequencies can be used (energy efficient and will be faster).

An example of this is the Goertzel algorithm. In addition, frequency estimation techniques can be used with different approaches (instead of FFT) (e.g., periodogram—spectral density estimation). The pseudo code for the secret code/data extraction component from the overlaid (over-the-air) covered voice is given below (on the next page):

Covered voice analysis and hidden code/data decoding (1201) are performed by taking the covered sound via the mobile telephone microphone (900) and processing it with the covered voice receiving and processing component block (1200). Invention's hidden voice analysis and hidden code/data decoding (1201) subcomponents can be realized by means of mobile phone hardware and operating system features, programming tools with libraries especially containing FFT operations. Using the single tap mobile application icon (1204) on the mobile phone (device) screen (1202), the code/data decoding component is activated instantly (in real time) by starting the covered voice receiv-

```
marker_start = 0
fs = 256
start:
cnt = fs / 2
sht = cnt / 2
frame0 = new 256 examples
frame1 = new 256 examples
Repeat:
Af ( ) = FFT (frame0 (0))              (Search marker)
search:
if (Af (m) <th) frame0 = frame1,       (frame1 = new 256 examples)
    if (keep searching) goto again
    elsegoto end
elseALf ( ) = FFT (frame0) cnt-sht)    (If Marker signal is detected
    If ARf ( ) = FFT (frame0) cnt + sht)              search starting block)
    if (ALf (m)>ARf (m)) cnt = cnt-sht
    elsecnt = cnt + sht
sht = sht / 2
if (sht<8) goto search
marker_start = cnt, bit_no = 0, data = 0
marker frame0 (0) = frame0 (marker start)  ... ... ...    256 elements copy
0. bit data frame1 (0) = frame1 (marker start) ... ... ...   256 elements copy
bit_loop: ADf ( ) = FFT (frame1 (0))   (... binary 8 bit data is obtained)
    ifADf (m−5)>ADf (m + 5) data (bit_no) = 0
    else data (bit_no) = 1
    frame0 = frame1
    frame (marker_start) = new sample (256)
    if (bit_no<8) gotobit_loop
    data: There is embedded code in 8 bit audio
    process the data ...
    goto start
```

As shown in FIG. 10, the implicit voice (hidden data/embedded voice) input is applied to the secret data/decoding component block in the overall data hiding system. The normal sequence starts with the detection of the signal carrying the marker frequency. In this case, the DS output indicates that the secret data/code has started as "1" and (N+10) remains at the logic level "1" during the Bit period. After 1.5 Bit time after DS is detected as "1" in SSC and CSC input, SSC and CSC subcomponent starts to sample "Data Output" (1014) as input. Sampling is repeated (N+8) times. In all the samples in the "Data Output" entry, it is tested whether the entry "Valid Data" (1015) is also "1". If "Valid Data" is "0" for any Bit, the data detection is made incorrectly. After completing the process for (N+8) bits, the sum of the pieces of N Bit data in 8-bit blocks and the last 8-bit "Accuracy Test" data received is positive, and if the "Valid Data" "1" is detected in all Bits, the resolved N-Bit confidential data/code integrity is verified. In this case, finally, N-Bit data is transmitted to the "Data Outputs $(D_0 \text{-}_{DN-1})$" (1018) output and data integrity information (DOK) (1019) output is "1". When a device which reads this data, sets the data reading input (RD) 1017 to "1", so the system can initiate the new secret data/code detection process.

Mobile Application: The general scheme of mobile device application, including the hidden code/data extraction component, is presented in FIG. 12.

ing. After detection of valid hidden code in the sound mobile device application (1108) interacts with web server (1106). Mobile device application (1108) can be realized on different mobile application development platforms by considering mobile device operating systems (iOS, Android etc.).

Figure 13:
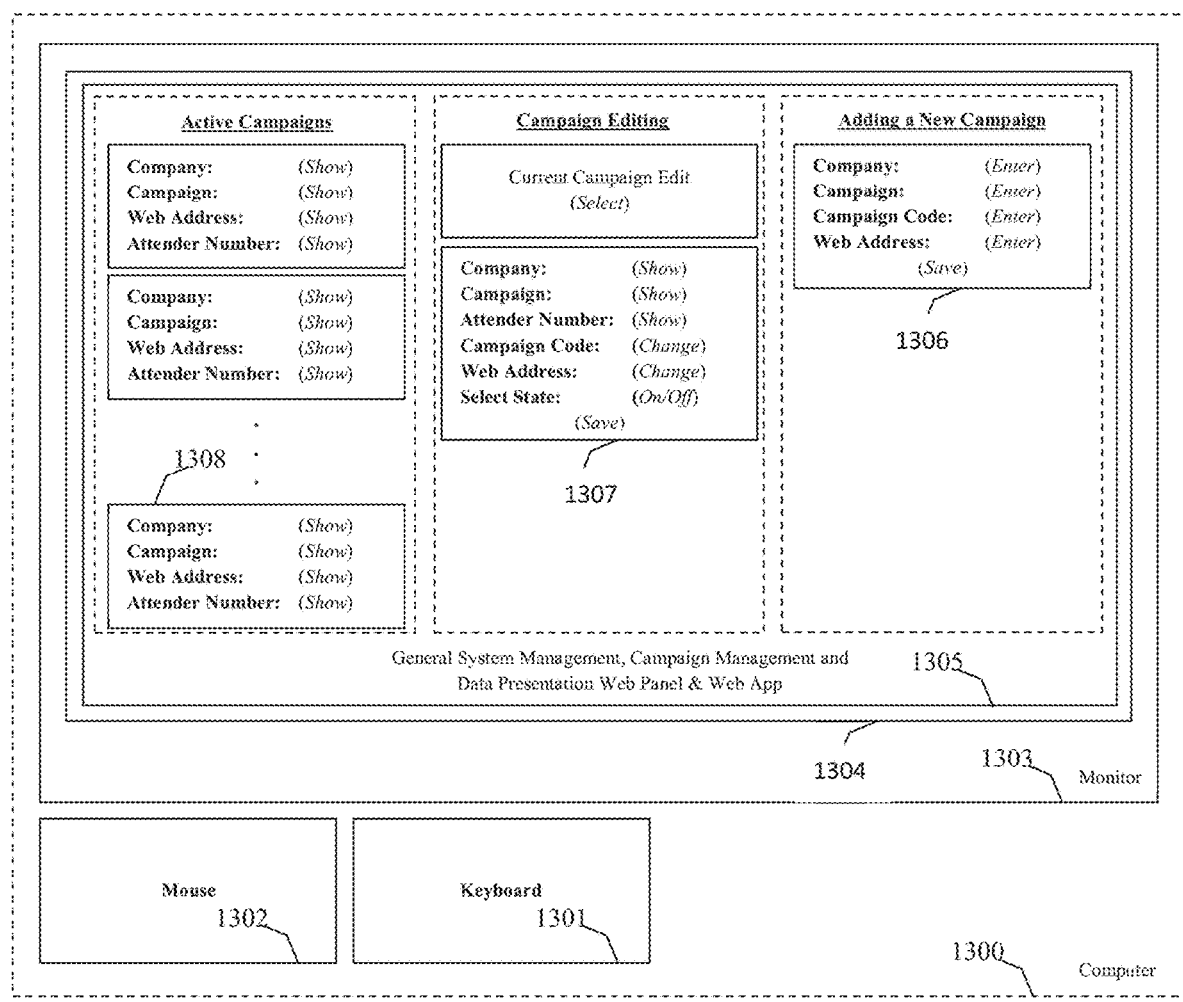

Web Management and Presentation Panel: The general web panel, software and sub-components of the data presentation are shown in FIG. 13.

By means of the general system management web panel software, campaign management and data presentation (1305), general system management, ad campaign participation and monitoring of the code/data hiding method, sample application model management and data presentation are realized. Campaign definition, which is hiding the code/data equivalent of the cover sound file, is made in the component (code/data—url matching definition) (1306) and when necessary, campaign editing (code/data—url matching change) can be made from the component (1307). All active campaigns can be tracked in the active campaigns (data representation) section (1308) to visualize the interactions of users and for data analysis.

Three preferred application structures for the operation and systematic use of the invention in relation to the computerized code/data hiding, resistant to air transmission of the voice are shown in FIG. 14, FIG. 15 and FIG. 16. These examples, which do not mean to limit the areas of use of the invention, aim to explain the usage and operation of the invention in a wide range of sectors, from security to entertainment, from authentication to copyright protection.

The general system, which is one of the application areas of the invention, and the preferred advertising campaign application processes are presented in FIG. 14. By capturing and decoding the code/data hidden in the sound with the mobile phone microphone in the environment where it is played, it is possible to direct the user (customer) to a desired channel by server interaction. For example, the user mobile phone web browser can be registered automatically by navigating to the web page/campaign associated with the secret code/data.

With another preferred embodiment, the exemplary usage of the invention is shown in FIG. 15. In this model, the number and information of the user (audience/listener) can be obtained and visualized to measure TV/radio viewing/ watching rate. With the device attached to the TV/radio broadcast output, covered sound can be received and the rating of views of all channels can be reported.

In FIG. 16, in another preferred application example, the logic of use of the invention is presented in order to provide (hop) coupons and discounts in shopping centers. At the entrance of the user (customer) to a shopping center, it is possible for companies that provide coupons/discounts by running the mobile application with a warning message about the application, to benefit from the opportunities provided instantly by interaction with the server in relation to the secret code/data in their publications.

APPLICABILITY TO INDUSTRY

The invention can be used in a wide range of industries ranging from security to entertainment, from authentication to copyright protection. Automatically generate TV/radio/ channel view statistics, promote broadcast views, analyze radio/TV ad effectiveness and cost analysis, copyright and activity tracking, participation in campaigns, participation in surveys, participation in sweepstakes, participation in voting, coupon distributions, multimedia file stamping and general or customized identity can be used in verification fields and customer (user) interactivity.

What is claimed is:

1. A method for embedding a secret code/data in a covered audio file, enabling valuable information acquisition based on user interaction and user product experience, the method comprising:
   receiving the secret code/data within the covered audio file using a device with a microphone, after the covered audio file is played through a speaker in any music and sound system, without being affected by the distorting effects of the analog transmission environment;
   generating a marker signal having a pre-determined frequency distinct from the covered audio file;
   applying a windowing process to the covered audio file to minimize spectral leakage, resulting a window covered audio file;
   performing a sampling process to the windowed covered audio file to facilitate accurate processing of the as covered audio file in a digital format;
   conducting gain control to normalize the amplitude of the covered audio file;
   executing a loading process to prepare the covered audio file for data embedding in a processing unit;
   triggering a clock operation for synchronization of the embedding process;
   conducting a specific Fast Fourier Transform (FFT) transaction on the covered audio file;
   modifying the frequency domain of the covered audio file to embed at least one data bit based on the predetermined specific frequency of the marker signal;
   applying as specific Inverse Fast Fourier Transform (IFFT) transaction to convert the modified frequency domain back to the time domain;
   applying a specific filtering process to the modified covered audio file to minimize audible artifacts introduced by the data embedding process; and
   outputting the processed covered audio file containing the embedded secret code/data,
   wherein, the at least one data bit is represented by altering specific frequencies corresponding to logic-0 and logic-1 levels.

2. The method according to claim 1, wherein the device used to receive secrete code/data is selected form a mobile phone, computer, television, radio, etc., provided that the device is configured with the microphone.

3. The method according to claim 1, wherein the covered audio file received by the microphone comprises 256 samples.

4. The method according to claim 1, wherein the covered audio file is processed in real time.

5. The method according to claim 4, wherein real-time processing of the covered audio file is not affected from the distortion introduced by the analog air transmission environment from the speaker to the microphone.

6. The method according to claim 1, wherein the method further comprises detecting a specific pointer for synchronization and initiating data extraction based on the detected pointer.

7. The method according to claim 1, wherein the method further comprises dynamically detecting the starting point for data extraction.

8. The method according to claim 1, wherein the at least one data bits is decoded.

9. The method according to claim 1, wherein the covered audio file containing the embedded secret code/data is transmitted as RF, satellite, direct connection, or broadcast.

10. The method according to claim 1, wherein the marker signal comprises 256 samples representing logic-0 level and logic-1 levels at specifically defined frequencies.

11. The method according to claim 10, wherein the logic-0 level and logic-1 level are defined by 19 specific frequency values.

12. The method according to claim 10, wherein the 256 samples include certain sequences representing pointers, 1, 0, and space.

13. The method according to claim 1, wherein the real-time secret code/data decoding is performed by a processor within the device.

14. The method according to claim 1, wherein the device comprises an application icon, a voice receiving icon, and a voice processing icon.

15. The method according to claim 1, wherein the device further comprises a computerized web server, a database unit for a real-time secret code/data-specific functionality, and a data analysis unit, integrated with a cloud network.

* * * * *